(12) United States Patent
Spenninger et al.

(10) Patent No.: US 10,069,447 B2
(45) Date of Patent: Sep. 4, 2018

(54) METHOD AND ARRANGEMENT FOR REDUCING THE TORQUE RIPPLE OF A DC MOTOR

(71) Applicant: Kastanienbaum GmbH, München (DE)

(72) Inventors: Andreas Spenninger, Karlsfeld (DE); Niklas Böhme, Velbert (DE); Sami Haddadin, Hannover (DE)

(73) Assignee: Kastanienbaum GmbH, München (DE)

( * ) Notice: Subject to any disclaimer, the term of this patent is extended or adjusted under 35 U.S.C. 154(b) by 0 days.

(21) Appl. No.: 15/305,912

(22) PCT Filed: Apr. 23, 2015

(86) PCT No.: PCT/DE2015/100171
§ 371 (c)(1),
(2) Date: Oct. 21, 2016

(87) PCT Pub. No.: WO2015/161844
PCT Pub. Date: Oct. 29, 2015

(65) Prior Publication Data
US 2017/0047872 A1 Feb. 16, 2017

(30) Foreign Application Priority Data
Apr. 23, 2014 (DE) .................. 10 2014 105 730

(51) Int. Cl.
*H02P 21/00* (2016.01)
*H02P 6/10* (2006.01)
(Continued)

(52) U.S. Cl.
CPC ............... *H02P 6/10* (2013.01); *H02P 21/22* (2016.02); *H02P 27/08* (2013.01)

(58) Field of Classification Search
CPC ............ H02P 6/10; H02P 21/22; H02P 27/08
(Continued)

(56) References Cited

U.S. PATENT DOCUMENTS 5,223,775 A 6/1993 Mongeau
5,808,437 A * 9/1998 Schob ................. F16C 32/0453
318/623
(Continued)

FOREIGN PATENT DOCUMENTS

DE 3941495 A1 6/1990
DE 3941553 A1 6/1990
(Continued)

OTHER PUBLICATIONS

International Preliminary Report on Patentability issued in International Application No. PCT/DE2015/100171 dated Oct. 25, 2016.

*Primary Examiner* — Eduardo Colon Santana
*Assistant Examiner* — Gabriel Agared
(74) *Attorney, Agent, or Firm* — Hoffmann & Baron, LLP (57) ABSTRACT

A method and arrangement for reducing the torque ripple of a brushless DC motor having a stator, a rotor, and a motor control unit, via which motor control unit the motor is controlled in a polyphase manner, having a data memory for storing rotational angle-dependent correction data of the control current of the motor, which are impressed on the instantaneous values for controlling the motor. In a first step, for each position of the rotor, the phase currents holding the rotor in this position are determined and are used to derive reference current data, which is stored in a table of the data memory together with the respective position data of the rotor, determined by the position sensor. In a second step, during continuous operation of the motor, the position-dependent reference current data stored in the data memory is combined with the control current of the motor.

9 Claims, 5 Drawing Sheets

(51) Int. Cl.
*H02P 21/22* (2016.01)
*H02P 27/08* (2006.01)

(58) Field of Classification Search
USPC .................................................. 318/400.02
See application file for complete search history.

(56) References Cited

U.S. PATENT DOCUMENTS

| | | | | |
|---|---|---|---|---|
| 5,844,388 A | * | 12/1998 | Maiocchi | H02P 6/10 318/400.12 |
| 6,028,549 A | | 2/2000 | Buckreuss et al. | |
| 2011/0125320 A1 | | 5/2011 | Bongardt et al. | |
| 2012/0217908 A1 | * | 8/2012 | Wu | H02P 21/04 318/400.02 |

FOREIGN PATENT DOCUMENTS

| | | |
|---|---|---|
| DE | 4026091 A1 | 2/1992 |
| DE | 69217199 T2 | 7/1997 |
| DE | 69605019 T2 | 7/1997 |
| DE | 19822957 C1 | 5/2000 |
| DE | 102008007100 A1 | 8/2009 |
| DE | 102009054112 A1 | 5/2011 |
| EP | 0792420 B1 | 3/1997 |
| EP | 1061640 A2 | 12/2000 |
| EP | 1496603 A2 | 1/2005 |
| EP | 1638200 A2 | 3/2006 |
| JP | 2014002698 A | 1/2014 |
| WO | 93/09595 | 5/1993 |

\* cited by examiner

METHOD AND ARRANGEMENT FOR REDUCING THE TORQUE RIPPLE OF A DC MOTOR

CROSS-REFERENCE TO RELATED APPLICATIONS

This application is the U.S. National Phase of, and Applicant claims priority from, International Application No. PCT/DE2015/100171, filed 23 Apr. 2015, and German Patent Application No. DE 10 2014 105 730.9, filed 23 Apr. 2014, both of which are incorporated herein by reference in their entirety.

BACKGROUND

Field

The invention relates to a method of reducing the torque ripple of a DC motor and to an arrangement for controlling a DC motor to reduce the torque ripple of the DC motor.

Related Art

DC motors are used in many technical areas, in particular brushless DC motors, which are constructed in principle as three-phase synchronous machines with excitation by permanent magnets. The rotating magnetic field of the three-phase winding results in movement of the permanently excited rotor. Such a motor displays the behavior of a DC motor by using suitable regulators. In particular, such motors are used in small drives. When using suitable transmissions with a high translation ratio, high torques can be achieved even in small motors, as is especially relevant in the construction of robots.

As a rule, the three-phase winding of such a motor is constructed with three phases.

Torque fluctuations, which are quite pronounced in particular in favorable motors, are produced by magnetizing processes of the iron-containing stator structure in the coils, but also by mechanical inaccuracies such as variable strengths of the magnets, differently shaped windings, or imprecisely placed magnets. These torque fluctuations are disturbing and unsuited if high precision is required when used in highly precise applications, and at low speeds such as occur in the case of robot joints. In order to reduce such torque fluctuations or ripple, motors with higher phase numbers can be used. However, this requires a greater complexity and also causes significantly greater expenses.

Another attempt to reduce the torque ripple consists of using rotors without iron and which include self-carrying coils. However, the torque ripple can only be reduced, but not avoided in this manner.

The regulation of a brushless DC motor can take place by a sensor-controlled commutation, which also functions at low speeds or at a standstill of the motor. However, it is also known in the case of higher requirements, to use vector regulation in which the voltages of the rotor phases are adapted to the desired torque.

Systems are also known in which the torque ripple of a motor is regulated electronically in that correction data are impressed on the control current of the motor during its rotation, which were determined from mechanical data of the motor, and stored in a memory so that the correction data can be superposed on the particular motor current as a function of the position.

Such a system is known from DE 39 41 553 A1. In this system, several different data sets in the form of tables are stored in a functional memory, which data sets are determined from the course of the power and of the torque of the motor, and optionally of the connected load, and which data sets take into account different influences, wherein the data sets are queried as a function of the position or the time and can be linked with an input magnitude, in order to be combined to instantaneous values dependent on the position and the time. The data sets, which take into account the course of the power and torque of the motor, are determined here by measuring runs for optimization and achieving the given course of the power and torque of a motor on a measuring and testing stand. Alternatively, the data sets can be calculated from a sample of measured parameters and/or characteristic curves.

A similar method is known from EP 564 608 B 1. Here too, a memory with a table of values is used, which values are used to correct the control currents for driving the motor.

EP 1 638 200 B1 describes a method of reducing the torque ripple in a motor in which a voltage difference is determined between the phases of the motor control unit, and compensation amplifications for the phases are stored in a memory for the phases, as a function of the phase angle, so that the amplification of the particular phases can be adjusted in such a manner that the torque ripple is reduced.

SUMMARY

The invention has the basic problem of indicating a method of reducing the torque ripple of a brushless DC motor and an arrangement to control a DC motor to reduce the torque ripple of the motor, with which the torque ripple can be very largely compensated even in motors with a simple construction, and disturbances can be compensated in almost every position of rotation of the motor.

The invention starts with a method of reducing the torque ripple of a brushless DC motor with a stator and a rotor by a motor control unit via which the motor is controlled in a polyphase manner, and with a data store for storing correction data of the control current of the motor, which correction data are dependent on the angle of rotation and which are impressed on the control current for controlling the motor.

According to the invention, in a first step, currents holding a rotor in each of a plurality of positions are determined, from which position-dependent reference current data are derived and stored in the data table, together with the particular position data of the motor. In a second step, during the running operation of the motor, the position-dependent reference current data stored in the data memory are linked with the control currents of the motor.

Therefore, the invention describes a method of generating correction data which are stored in a memory in order to be able to impress the correction data on the control current of the motor during running operation, as a result of which irregularities of the course of the motor of various types are compensated. In a preferred manner, a brushless DC motor is detected to this end, at first, in its characteristic curve in a test run, wherein disturbances influencing the position of rotation for each individual position of rotation of the rotor are detected which can be, e.g., the ripple on account of the permanent magnetic excitation but also influencing magnitudes of the eccentricity of the rotor, support influences, influences caused by the construction, and other disturbances. The influencing magnitudes determined in this manner are stored as correction data in an electronic memory depending on the particular rotor position of the motor.

In addition to the substantially static, position-dependent disturbances, the detected correction data can also be supplemented by other correction data which result, e.g., from the dynamic behavior of the motor, such as accelerations, speeds, imbalances, frictions, and temperatures, to the extent that these data can be detected or are already known.

In the second step, in which the motor is run in normal operation, the correction data are impressed on the control current of the motor so that the latter is influenced at each position of the rotor by the correction data in such a manner that a uniform running of the motor therefore results with a uniform torque, e.g., torque ripple is canceled or reduced.

The correction data of the motor can be determined on a test stand, wherein, based on the simple construction of the evaluation circuit, each individual motor of a series can be measured, which offers special advantages in particular in the case of inexpensive motors with a very simple construction.

However, such a motor can also be measured in the already mounted state, as a result of which during the detection of the disturbances, even construction elements connected to the motor, their inclusion, position, and other influencing magnitudes, can be detected.

The detecting of the position of the rotor includes every angular position of the rotor so that correction magnitudes can be determined over the entire rotation of the rotor. If the detection of position is additionally or alternatively carried out on a downstream transmission on its output, correction values can also be determined for larger angles of rotation of the motor than 360° so that even a drive chain, including motor, transmission, and optionally other mechanical elements in the drive train, can also be detected.

The method of the invention can be used one time on a "virgin" motor. It is also possible to carry out the method repeatedly, as a function of the degree of wear of the motor or of special loads, or to carry out the method prior to the using of an operating run as a "calibration run".

The controlling of the motor takes place in the test operation as well as in the normal operation preferably via a vector regulation, wherein the control currents of the motor are generated by a performance electronic system as pulse-width-modulated voltages, which are derived by an inverse Park transformation from a rotor-related two-phase control current. The phase currents are returned in the feedback circuit via a Park transformation and a Clark transformation onto the control current input. A static, rotor-related 2-phase system can be transformed into a rotating, stator-related 2-phase system by the vector regulation. Three-phase phase currents that drive the motor are generated via a subsequent pulse width modulation and via a performance electronic system. The three-phase control currents are converted back into a rotating two-phase system in the feedback circuit via a Clark transformation and transformed via a Park transformation back into a two-phase system in rotor coordinates so that they can be coupled back as static currents onto the control current. The control current that results to hold the rotor of the motor in test operation at a certain angular position is stored as a function of the angular position of the motor in an electronic table from which the correction data determined in this manner are superposed during the running operation of the motor on the particular control current.

A further embodiment of the invention can provide that a position predictor regulator is connected in front of the control input via which the position-related impression of the reference current data read from the data memory onto the control current can be varied as a function of the rotational speed of the rotor.

Based on the finite bandwidth and amplitude of the vector regulator, the correction data stored in the memory can be impressed therewith on the control current at deviating positions as a function of the rotational speed of the rotor, so that in this manner, speed-dependent errors in the correction method of the invention can be compensated.

During the detection of the correction data, several measured values (position-dependent reference current data) are recorded for each rotor position of the motor for reasons of accuracy. A few measured values can deviate particularly significantly from an actual value due to transient effects of the regulator. In distinction to the case of a simple white noise, a signal cannot be readily used for correction by determining an average value. Therefore, such data are eliminated from the position-dependent reference current data, which exceed or drop below the given boundary values. An average value curve can then be formed from the remaining correction data whose individual values are stored as position-dependent correction data.

Such a correction signal is sufficient in many instances for compensating the torque ripple. However, an improved method of preparing the correction data is preferred in which, after the removal of data exceeding or dropping below the given boundaries, the position-dependent reference current data determined for each individual rotor position can be sorted according to their magnitudes in such a manner that a median value can be determined for each individual rotor position. A tunnel with a fixed window width is placed around the particular median values relative to the individual rotor positions over the entire 360-degree angle, which tunnel therefore forms a data window that includes a fixed vertical width whose particular absolute value fluctuates as a function of each particular median value. Now, only the correction data which are located inside the window are used and an average value is formed from the correction data so that the correction data obtained in this manner are very largely free of outliers, statistical inaccuracies, and regulator influences.

The invention also makes it possible, as a function of the operating state of the motor or the load state, to switch between several stored correction curves which are selected as a function of certain parameters, e.g., the load or the speed. The switching between the curves can take place automatically during running operation, even during one revolution of the motor, or only at certain angular positions.

The arrangement of the invention for controlling a brushless DC motor includes a position sensor on the motor rotor for detecting the instantaneous relative or absolute position of the rotor. In a test run of the motor, the phase currents for controlling the motor are determined in rotational angle-dependent positions, and are stored as position-related reference current values that hold the rotor in the rotational positions, at first, in a data memory. The reference current values can be read from the data memory during the running operation of the motor and impressed on the control current for controlling the motor.

The arrangement includes, in particular, a vector regulation including the following: a transformation module (inverse Park transformation) in the forward path of the regulator for converting from a rotor-related 2-phase system into a stator-related 2-phase system, a performance electronic system for the three-phase control of the motor, a transformation module (Clark transformation) for converting the phase currents of the rotor back into a stator-related 2-phase system, and a transformation module (Park transformation) for converting the stator-related 2-phase system into a rotor-related 2-phase system, whose current values are coupled back onto the control current.

The regulator architecture of the vector regulator is preferably designed as a software control which is received in a digital signal processor. Only the performance electronic system and the amplifier circuit for controlling the phase currents of the motor are designed as hardware. The vector regulation uses, substantially as such already known, transformation modules such as a Park transformation and a Clark transformation. The memory for receiving the correction data is preferably also part of the digital signal processor.

In order to be able to compensate regulator delays and position detection run time influences, a position predictor regulator is preferably used which determines, from the rotor speed and the angular resolution of the position sensor during the running operation of the motor, a new position value at which the reference current data of the original position are impressed on the control current as a function of the instantaneous speed of the motor. Therefore, exact position-dependent corrections can be carried out even at high motor speeds.

The invention is especially suited for being used in a robot that includes a plurality of articulations, which are driven by brushless DC motors that require high precision. Nevertheless, economical motors can be used by the invention. Furthermore, the invention also allows the inclusion of transmissions and other mechanical components into the correction process of the drive motor.

BRIEF DESCRIPTION OF THE DRAWINGS

The invention is explained in detail in the following using an exemplary embodiment. In the drawings.

DETAILED DESCRIPTION

Figures 1A, 1B:
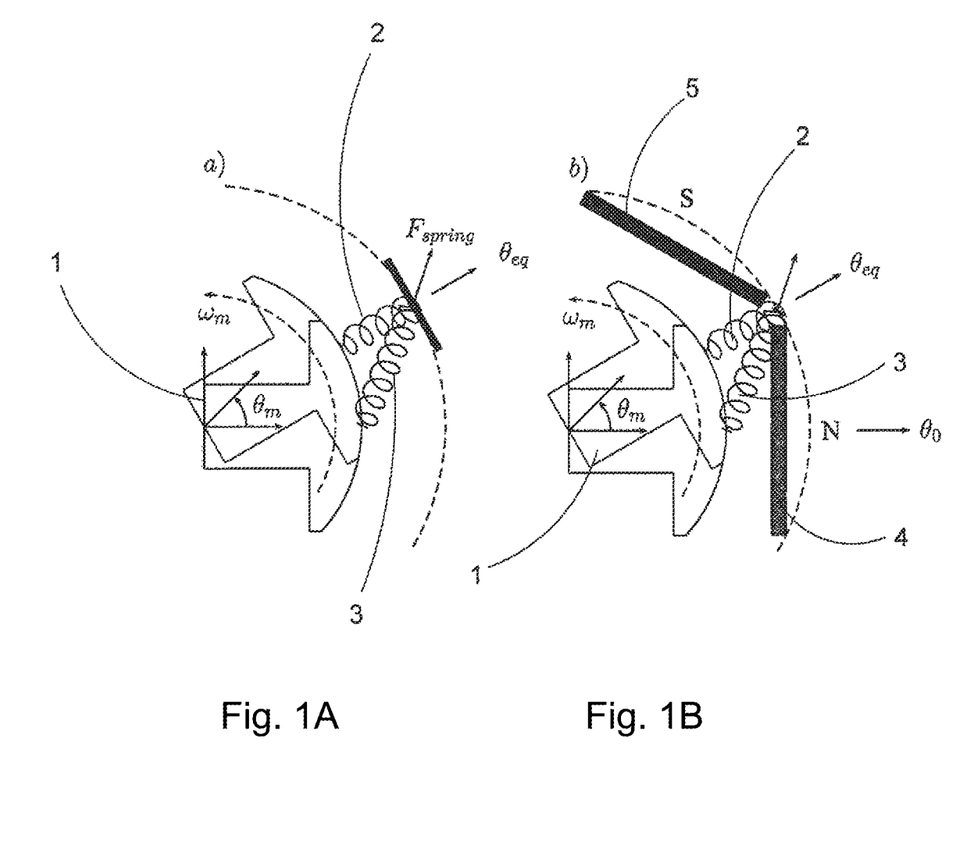
FIGS. 1A and 1B show a schematic view of construction-conditioned influence magnitudes on a brushless DC motor on the torque ripple.

FIG. 1A shows a basic view of a mechanical equivalent of a brushless DC motor in which a rotor 1 is fastened by springs 2 and 3 to a point of equilibrium. The spring force on the point of equilibrium corresponds substantially to the force attacking this point by the spring 2 minus the spring force of spring 3, based on the deflection of the rotor 1 out of the position of equilibrium. It should be noted that springs 2 and 3 symbolize respective magnetic forces, also referred to as magnetic fields, in relation to the point of equilibrium, as will be described in reference to FIG. 1B below.

FIG. 1B shows a corresponding diagram that shows a north pole 4 and a south pole 5, which show permanent magnetic fields in a brushless DC motor. In order to bring a rotor 1 into a position of equilibrium between the permanent magnets, a current is required for compensating the magnetic forces, as symbolized by springs 2 and 3.

Figure 2:
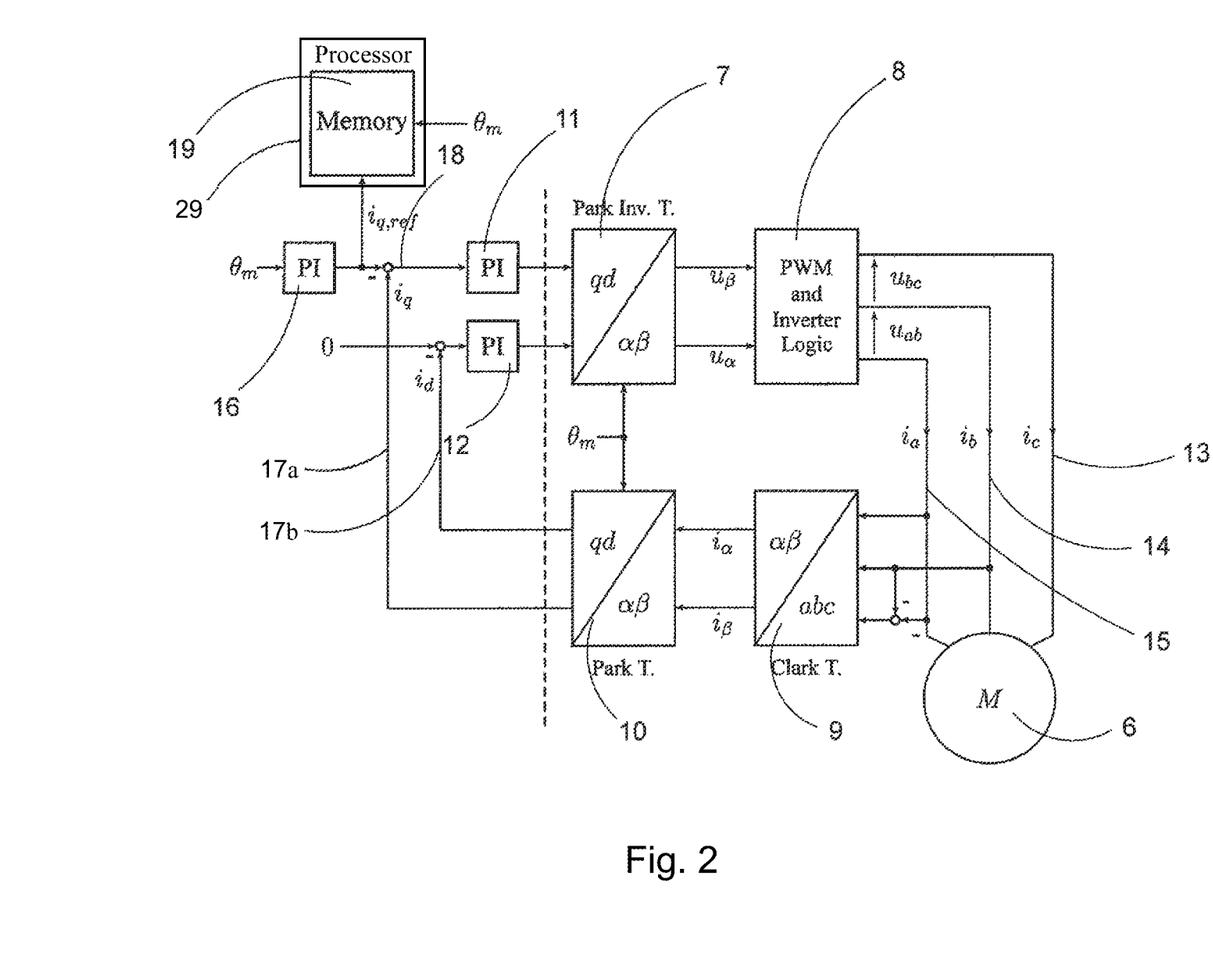
FIG. 2 shows a basic circuit construction of an arrangement for detecting correction data of a brushless DC motor.

FIG. 2 shows a control circuit to determine correction data for compensating torque ripples in a brushless DC motor.

A reference current $i_{q,ref}$ 18 is derived from the rotor position of the motor 6 by a PI regulator 16 and which adjusts as a guide magnitude the motor 6 by a vector regulator in such a manner that the latter maintains or holds a certain rotational angle position. The guide magnitude is represented in a two-phase, rotor-related coordinate system. The static, rotor-related coordinate system is converted by PI-regulators 11, 12 and a subsequent, inverse Park transformation 7 into a rotating 2-phase coordinate system, with the voltages $U_\beta$ and $U_\alpha$. A pulse width modulation and amplification of the rotating 2-phase system takes place in a pulse width modulator and inventor logic block 8, in a rotating 3-phase system in which an amplifier generates phase currents 13, 14, and 15 to control the motor 6. The feedback of the regulating magnitude takes place by a Clark transformation 9 and a Park transformation 10, wherein in the Clark transformation 9 the rotating phase currents detected in stator coordinates are converted into two-phase, rotating currents and the rotating 2-phase system is converted by the Park transformation 10 into a static, rotor-related 2-phase system, so that currents 17a, 17b are returned onto the currents that are supplied to the PI-regulators 11 and 12, respectively. The reference current data $i_{q,ref}$ 18 detected in this manner are recorded in a data memory 19, relative to the particular rotational angle position of the motor 6.

If the correction data are to be related not only to the rotational angle of the motor 6, but a subsequent transmission is also to be included, a position sensor can also be attached to a subsequent stage so that the entire unit including motor and transmission, and optionally other mechanical components, can be used for the detection of correction data so that the correction data refers to the rotational angle position, e.g., the output shaft of a transmission. It is also possible to detect correction data which refers, on the one hand to the torque ripple of the rotor, and on the other hand detects other disturbances in a transmission connected to the motor, wherein the correction data can be superposed on one another during the running of the motor.

The arrangement according to the invention to reduce the torque ripple uses at least two current sensors which detect the output currents on each phase of the motor 6. A position sensor is required on the motor rotor which determines the relative or absolute rotor position. The current sensors and position sensor are connected to a processor 29 whose output is coupled to an amplification stage, wherein the processor supplies a voltage equivalent to the phase currents on each phase of the motor. At the same time, the processor 29 includes a memory 19, which can store and read out the compensation currents 21 as correction data in order to reduce the torque ripples. The correction data in the form of current amplitudes for each of the rotor angular positions is added, corresponding to an addition factor, to the control current 20 for each of the rotor angular positions, as described in greater detail below with reference to FIG. 3.

Figure 3:
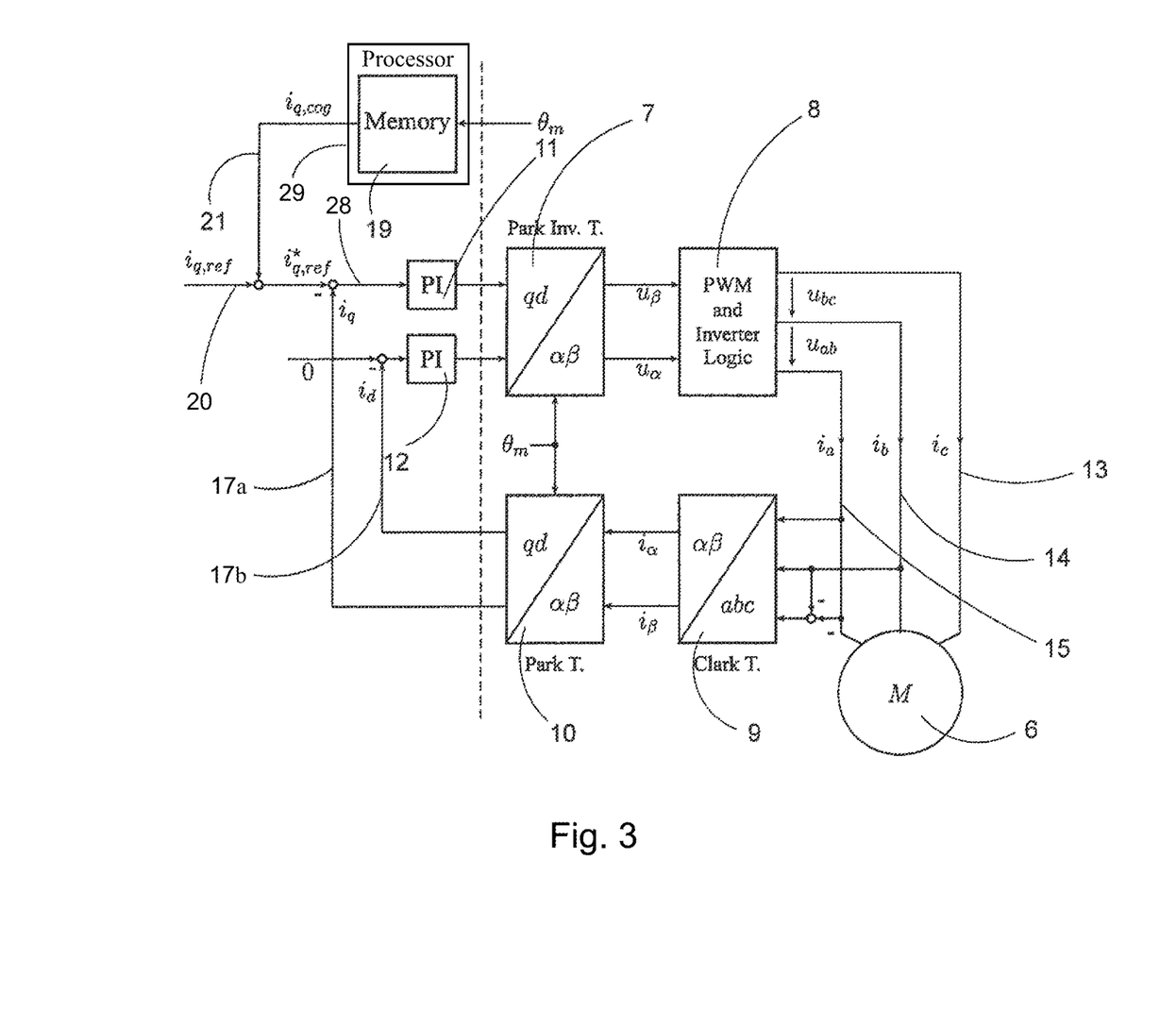
FIG. 3 shows an arrangement for correcting the control current with the aid of correction data read from a memory.

FIG. 3 shows a view corresponding to FIG. 2 in which the processor 29 reads out correction data $i_{q,cog}$ 21 from the memory 19 and superposes the correction data 21 on a control current $i_{q,ref}$ 20 so that a corrected control current $i^*_{q,ref}$ 28 which takes into account the correction data 21 is supplied to the PI-regulator 11. As a result, the motor 6 receives corrected control currents which lead to a compensation of a torque-dependent ripple of the motor drive.

Figure 4A:
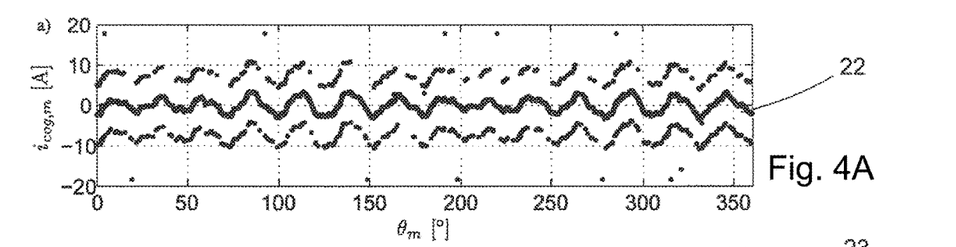
FIGS. 4A-4D show views for explaining a method of improving the determined correction data.

FIGS. 4A-4D show views for the preparation of the detected correction data. More specifically, FIG. 4A shows that a plurality of correction data is detected for each angular position of the motor which forms a so-called point cloud 22 for each angle.

Figure 4B:
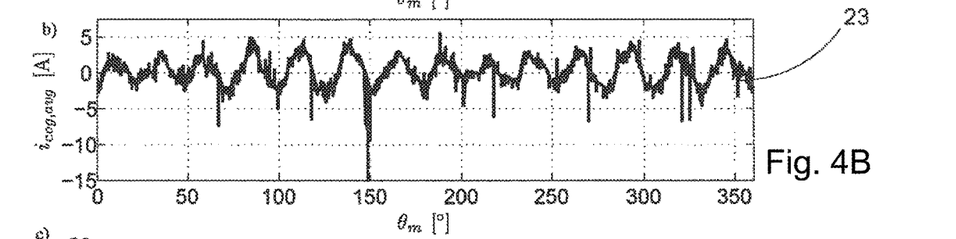

An average value 23 according to rotational angles can be calculated from these position-dependent point clouds and is shown in FIG. 4B. This average value 23 shows a few outliers that are based, for example, on regulator inaccuracies and transient behaviors. Outliers of the type shown in FIG. 4B can be removed from the particular point clouds of FIG. 4A by a suitable limitation circuit. The amplitudes of the detected correction values, which amplitudes are improved with the above elimination of outliers, are then sorted, at first according to their size, and particular median values of the correction data are determined for each of the angular positions of the rotor.

Figure 4C:
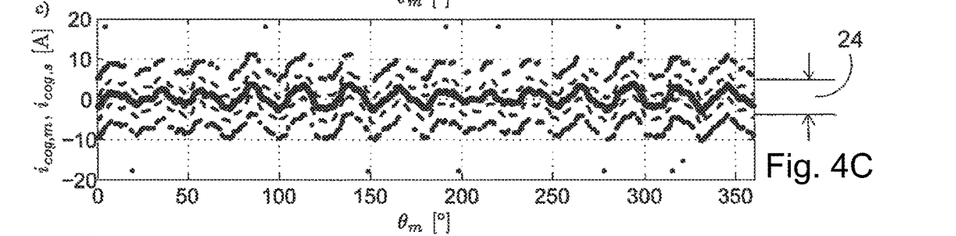

An envelope is now determined according to FIG. 4C, relative to these median values along the entire 360-degree circumference of the rotor, which envelope forms a fixed tunnel 24 for the particular median values. In this manner, data values that are based, for example, on noise or other irregularities can be excluded from the correction data.

Figure 4D:
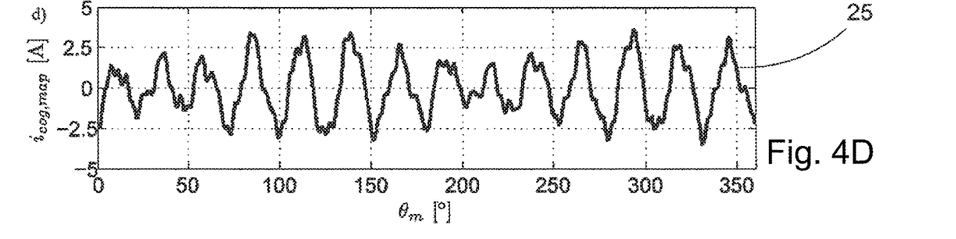

An average value is now formed from the data values (correction values) located inside the tunnel 24 for each of the angular positions, which forms a position-related curve 25 (compensation signal) of the correction data, as shown in FIG. 4D. These correction data are stored in the memory 19 and used during the running of the motor 6 in normal operation to correct the guidance magnitude.

With the aid of this method, a simple yet precise preparation of data can take place without filter functions, which would require expensive signal processing. A substantially smooth compensation signal 25 that is available during operation of the motor 6 for the compensation of the torque ripples is available as a result.

When using a position predictor regulator, the correction data can also be supplied to the control current of the motor at a time which deviates from the actual regulating position of the motor. This makes it possible to vary the particular time of the application of the correction data as a function of the motor speed in order to compensate differences of run time of the regulator used and other speed-dependent control magnitudes.

Figure 5:
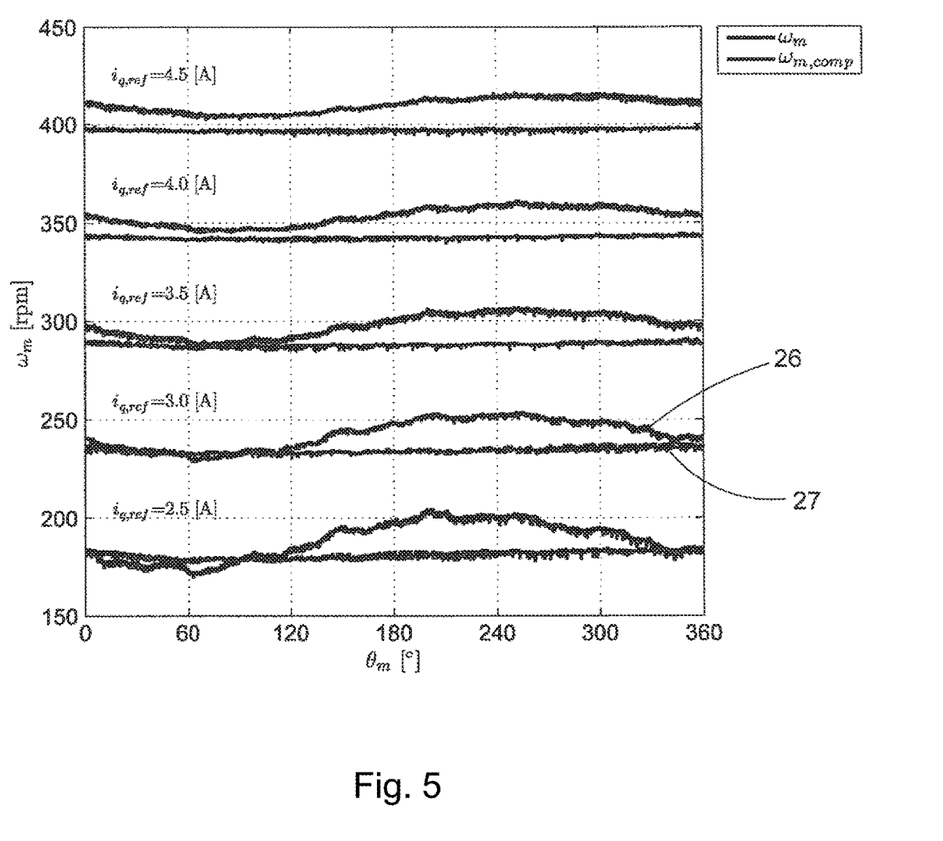
FIG. 5 shows a view for explaining a correction of speed-dependent influencing magnitudes in a brushless DC motor.

FIG. 5 shows several curves at different speeds of rotation of a motor in which the particular curved curves 26 display a remaining torque ripple at rather high speeds, whereas the particular substantially straight-lined curves 27 show the state when a position predictor regulator is used which makes possible a shifting of the correction data to reduce the remaining torque ripple.

The calculation of the shift takes place by determining the rotor frequency of the angle traversed in a calculating step, taking into account the sensor resolution. This allows a new position for applying the correction signal to be determined. In another embodiment of the method, it is also possible to perform a shifting of the position not only upon the receiving of a constant speed of the motor, but also as a function of speed changes, i.e., acceleration or braking.

In the method for detecting the rotor/sensor positions, the accuracy of the detection also depends on the resolution of the position sensor. Therefore, the resolution should be high enough that, in addition to the disturbances conditioned by the construction based on the torque ripple caused by the magnets, even other influencing magnitudes, such as disturbances from the mounting, etc., can be compensated.

REFERENCE NUMERALS 1 rotor
2 spring
3 spring
4 magnet (north)
5 magnet (south)
6 motor
7 inverse Park transmission module
8 pulse width module and inverter
9 Clark transmission module
10 Park transmission module
11 PI regulator
12 PI regulator
13 phase current $i_c$
14 phase current $i_b$
15 phase current $i_a$
16 PI regulator
17a current $i_q$
17b current $i_d$
18 reference current $i_{q,ref}$
19 memory
20 control current $i_{q,ref}$
21 correction data $i_{q,cog}$
22 point cloud
23 average value
24 tunnel
25 reference current value
26 curved curve
27 straight-line curve
28 corrected control current $i^*_{q,ref}$
29 processor

The invention claimed is:

1. A method of reducing torque ripple of a brushless DC motor with a stator and a rotor, and a motor control unit that controls the motor in a polyphase manner, and a data memory to store correction data for a control current of the motor, the correction data being a function of an angle of rotation of the rotor and impressed on the control current to control the motor, the method comprising:

determining currents that hold the rotor in each of a plurality of positions, the plurality of positions determined by a position sensor;

deriving position-dependent reference current data from the currents for the plurality of positions of the rotor, wherein deriving the position-dependent reference current data comprises eliminating one or more position-dependent reference current data from the position-dependent reference current data for at least one position of the rotor when the one or more position-dependent reference current data exceed or drop below given boundary limits, determining median values of the position-dependent reference current data for the plurality of position of the rotor;

forming a tunnel relative to the determined median values over the plurality of positions, wherein the tunnel is a fixed distance around each of the median values;

calculating average values from the position-dependent reference current data located within the tunnel;

storing in the data memory the average values as the position-dependent reference current data together with respective positions of the rotor; and impressing the position-dependent reference current data from the data memory onto the control current of the motor to generate a corrected control current in association with the respective positions, enabling the motor control unit to control the motor in a manner that the torque ripple of the motor is reduced or canceled during operation of the motor.

2. The method according to claim 1, wherein the method further comprises controlling the motor by vector regulation, the vector regulation comprising:
  generating first phase currents of the motor using a performance electronic system from pulse-width-modulated voltages derived by an inverted Park transformation from a two-phase control current, wherein a phase of the two-phase control current includes the corrected control current; and
  returning second phase currents in a feedback circuit via a Clark transformation and a Park transformation onto the two-phase control current.

3. The method according to claim 1, wherein the method comprises varying impression of the position-dependent reference current data onto the control current as a function of rotational speed of the rotor using a position predictor regulator.

4. The method according to claim 1, wherein the method comprises using the brushless DC motor in an articulation of a robot to reduce or cancel the torque ripple.

5. An arrangement to reduce torque ripple of a brushless DC motor with a stator and a rotor, and a motor control unit that controls the motor in a polyphase manner, and a data memory to store correction data for a control current of the motor, the correction data being a function of an angle of rotation of the rotor and impressed on the control current to control the motor, the arrangement comprising:
  a position sensor to detect a plurality of positions of the rotor;
  at least two current sensors to detect phase currents of the rotor;
  a controller configured to determine from the phase currents detected by the sensors currents that hold the rotor in each of the plurality of positions determined by the position sensor; and
  a processor configured to:
  derive position-dependent reference current data from the currents for the plurality of positions of the rotor, wherein in deriving the position-dependent reference current data the processor is configured to eliminate one or more position-dependent reference current data from the position-dependent reference current data for at least one position of the rotor when the one or more position-dependent reference current data exceed or drop below given boundary limits;
  determine median values of the position-dependent reference current data for the plurality of position of the rotor;
  form a tunnel relative to the determined median values over the plurality of positions, wherein the tunnel is a fixed distance around each of the median values;
  calculate average values from the position-dependent reference current data located within the tunnel;
  store in the data memory the average values as the position-dependent reference current data together with respective positions of the rotor; and
  impress the position-dependent reference current data from the data memory onto the control current of the motor to generate a corrected control current in association with the respective positions enabling the motor control unit to control the motor in a manner that the torque ripple of the motor is reduced or canceled during operation of the motor.

6. The arrangement according to claim 5, wherein the motor control unit controls the motor by vector regulation, the vector regulation of the motor control unit comprising:
  a transmission module to convert a two-phase control current from a static 2-phase system to a rotating 2-phase system, wherein a phase of the two-phase control current includes the corrected control current;
  a performance electronic system to convert the rotating 2-phase system to three-phase currents to control the rotor;
  a transformation module to convert three-phase currents of the rotor into a rotating 2-phase system; and
  a transformation module for converting the rotating 2-phase system into a static 2-phase system whose current values are coupled back onto the two-phase control current.

7. The arrangement according to claim 6, wherein the performance electronic system comprises:
  a module to provide pulse width modulation of the rotating 2-phase system into phase voltages; and
  a circuit to amplify the phase voltages and generate the three-phase currents to control the rotor.

8. The arrangement according to claim 5, wherein the arrangement comprises a position predictor regulator to determine a new position of the rotor associated with an original position determined by the position sensor from speed of the rotor and angular resolution of the position sensor so that the processor impresses the position-dependent reference current data of the original position on the control current at the new position of the rotor as a function of the speed of the rotor.

9. The arrangement according to claim 5, wherein the brushless DC motor is used in an articulation of a robot to reduce or cancel the torque ripple.

* * * * *